United States Patent [19]

Scholz

[11] Patent Number: 5,760,717
[45] Date of Patent: Jun. 2, 1998

[54] METHOD AND CIRCUIT ARRANGEMENT FOR THE GENERATION OF A CHANNEL-CODED BINARY SIGNAL

[75] Inventor: Werner Scholz, Gehrden, Germany

[73] Assignee: Deutsche Thomson-Brandt GmbH, Villingen-Schwennigen, Germany

[21] Appl. No.: 686,144

[22] Filed: Jul. 25, 1996

[30] Foreign Application Priority Data

Sep. 14, 1995 [DE] Germany .................. 195 34 048.5

[51] Int. Cl.$^6$ .................................................. H03M 7/00
[52] U.S. Cl. ................................. 341/59; 341/58; 341/61
[58] Field of Search ................................. 341/61, 95, 58, 341/59

[56] References Cited

U.S. PATENT DOCUMENTS

| | | | |
|---|---|---|---|
| 4,779,072 | 10/1988 | van Gestel | 341/59 |
| 4,833,470 | 5/1989 | Iketani | 341/59 |
| 5,333,126 | 7/1994 | Fukuda et al. | 369/59 |
| 5,450,443 | 9/1995 | Siegel et al. | 375/286 |
| 5,557,594 | 9/1996 | Chiba et al. | 369/59 |

FOREIGN PATENT DOCUMENTS

| | | | |
|---|---|---|---|
| 2844216 | 10/1982 | Germany | H03K 13/00 |
| 3412860 | 10/1984 | Germany | H04N 7/13 |
| 3606396 | 8/1987 | Germany | H03M 7/14 |
| 4127984 | 2/1993 | Germany | H03M 7/14 |

*Primary Examiner*—Jeffrey A. Gaffin
*Assistant Examiner*—Jason L. W. Kost
*Attorney, Agent, or Firm*—Joseph S. Tripoli; Frederick A. Wein

[57] ABSTRACT

Low-redundancy codes are increasingly being striven for, such codes thus inevitably requiring comparatively long code words. However, since the memory requirement for coding tables increases considerably with the length of the code words, the use of code tables is then no longer expedient. Instead, coding is then effected by selecting the optimum code word in each case from a plurality of different code words taking account of coding; prescriptions and spectral decisions. For this purpose, the maximum run length for each code word is also determined, inter alia, but the spectral decisions are decisive as long as the maximum run length does not exceed a predetermined maximum value. Provided that the end of one code word and the beginning of a succeeding code word have the same binary value, incorrect decisions in the selection of the optimum code word may arise in the region where the synchronizing pattern is keyed in. According to the invention, therefore, the bit pattern (16) serving for synchronization is changed (17) prior to the determination of the code word which is optimum for generating the signal.

6 Claims, 1 Drawing Sheet

METHOD AND CIRCUIT ARRANGEMENT FOR THE GENERATION OF A CHANNEL-CODED BINARY SIGNAL

The invention relates to a method and a circuit arrangement for the generation of a channel-coded binary signal. Such signals are frequently used for adapting the signal spectrum to the transmission channel and for ensuring clock regeneration at the channel output.

PRIOR ART

Binary m/n codes are frequently used for the digital recording of data, in particular of audio or video data. In these codes, m respective data bits are transmitted as n-bit code words, where n>m. The purpose of this coding is normally to generate a DC-free and run length-limited recording signal (RLL code). The run length in this case specifies the number of successive bits having the same value, and run length limiting is intended to prevent the run length from exceeding a specific value.

In order to make synchronization possible, special bit patterns are keyed in between the code words at specific intervals. The synchronization bit patterns are selected in such a way that their maximum run length exceeds the maximum run length in the rest of the signal. This prevents the possibility of the undesired appearance of synchronizing bit patterns.

In the R-DAT system, use is made, for example, of an 8/10 code, in which 10-bit code words are assigned to the data bytes (8-bit data words). The coding can be carried out with code tables in this case.

Low-redundancy codes are increasingly being striven for, such codes inevitably requiring comparatively long code words. The use of code tables is then no longer expedient, since the memory requirement for the storage of these code tables increases considerably with the length of the code words. Instead, coding is then effected in that a plurality of n-bit code words are generated for each m-bit data word with the aid of precoding circuits and the optimum code word is selected from the various code words taking account of coding prescriptions and spectral decisions.

INVENTION

The invention is based on the object of specifying a method for the generation of a channel-coded binary signal in which an incorrect decision in the selection of the optimum code word can be precluded using simple means, without requiring a complex selection logic arrangement. This object is achieved by means of the method specified in claim 1.

The invention is based on the further object of specifying a circuit arrangement for the application of the method according to the invention. This object is achieved by means of the circuit arrangement specified in claim 4.

In accordance with the coding prescription, the spectral decision is typically decisive for the selection of the optimum code word, as long as the maximum run length does not exceed a predetermined maximum value. Provided that the end of one code word and the beginning of a succeeding code word have the same binary value, incorrect decisions in the selection of the optimum code word may arise in the region where the synchronizing pattern is keyed in. In this case, the sum of the run length at the end of the previously selected code word and the run length at the beginning of the respectively investigated code word can reach a value which corresponds to the large run length value in the sync word. However, this is not registered when using a simple selection logic arrangement, since this run length value is present in any case in the region of the synchronizing pattern.

In principle, the inventive method for the generation of a channel-coded binary signal in which n-bit code words are respectively assigned to m data bits and bit patterns serving for synchronization are inserted into the signal now consists in influencing a circuit for determining the run length by changing the bit pattern serving for synchronization or by an additional level transition identification signal, in such a way that a reduced run length value is determined in the region of the bit patterns serving for synchronization.

In this case, the bit patterns serving for synchronization have a run length which is greater than the maximum run length value which is aimed at for the rest of the signal. The bit patterns are now advantageously changed upstream of the circuit unit serving to determine the run length, in such a way that the maximum run length value is less than or equal to the maximum run length value which is aimed at for the rest of the signal. Since the circuit for determining the run length identifies the level transitions in the bit stream and counts the bits between successive level transitions, the circuit for identifying the level transitions can also be influenced in such a way that an additional level transition is registered in the region of the large run length of the sync pattern.

The influencing of the run length determination is preferably carried out approximately in the centre of the large run length by inverting a bit or by generating an additional level transition identification signal.

In principle, the inventive circuit arrangement for a method for the generation of a channel-coded binary signal consists in the fact that a circuit generates pulses which, with the aid of an EXOR gate arranged upstream of a circuit unit serving to check the run length, effect a binary value inversion of one or more bits of the bit pattern serving for synchronization or constitute additional level transition identification pulses.

The pulses are advantageously generated at the sync block frequency fs, and they are preferably situated in the region of the large run length of the sync pattern.

In this case, the circuit arrangement can additionally have a preceding circuit, a block for generating bit patterns serving for synchronization, a changeover switch for inserting bit patterns, serving for synchronization, into the data stream, a circuit for spectrum comparison and circuits for the determination and selection of the optimum code word.

DRAWINGS

Exemplary embodiments of the invention are described with reference to the drawings, in which.

EXEMPLARY EMBODIMENTS

Figure 1:
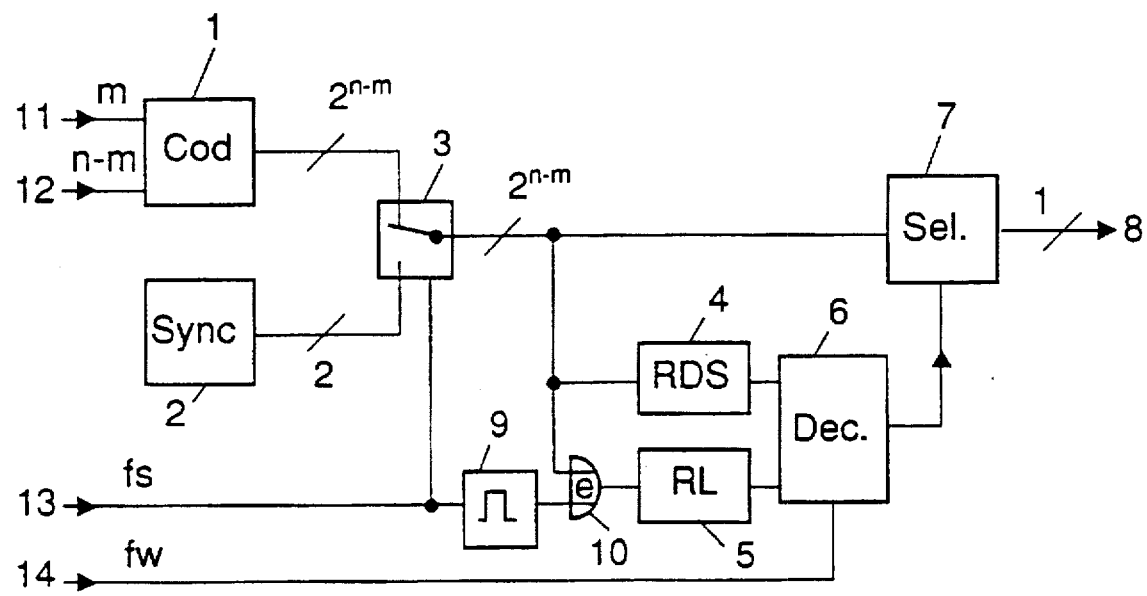
FIG. 1 shows a block diagram of a modulator circuit according to the invention

The block diagram in FIG. 1 shows the principle of an inventive modulator circuit for the generation of an m/n code without using coding tables m data bits are fed, for example, to the preceding circuit 1 via an input 11, and n-m additional bits are fed, for example, to the precoding circuit 1 via a second input 12. The precoding circuit now generates therefrom in each case $2^{n-m}$ different n-bit code words. Bit patterns which are generated in the block 2 and serve as synchronization signal are inserted into the sequence of these code words, by means of a changeover switch 3, at intervals predetermined by the sync block frequency fs.

These binary signals are then fed to the circuit units 4 and 5, in order to investigate the $2^{n-m}$ code words formed with each word timing to see which word is best suited for the generation of the m/n-coded signal. The block 4 in this case determines which of the code words leads to the smallest deviation from that profile of the digital sum which is required for generating the spectrum. The circuit unit 5 determines the maximum run length value for each code word. In this case, the sum of the run length at the end of the previously selected code word and the run length at the beginning of the respectively investigated code word is also formed, provided that the end and beginning of the two code words have the same binary value.

In so far as the run length values do not exceed the predetermined run length limit, the spectral decision in block 4 is decisive for the definitive decision in block 6 which takes place at the code word frequency fw. Otherwise, the run length decision in the circuit unit 5 has priority. The selected signal is then switched through to the output 8 of the selection circuit 7.

In order to prevent a possible incorrect decision in the selection of the optimum code word, a disturbance is keyed into the synchronization pattern upstream of the circuit unit 5. For this purpose, a pulse is generated in the stage 9 at the sync block frequency fs and, with the aid of the EXOR gate 10, effects a binary value inversion in the region of the large run length of the synchronization pattern. As a result, the run length of the synchronization pattern upstream of the selection circuit is distinctly below the maximum run length and thus has no influence on the code word selection.

Figure 2:
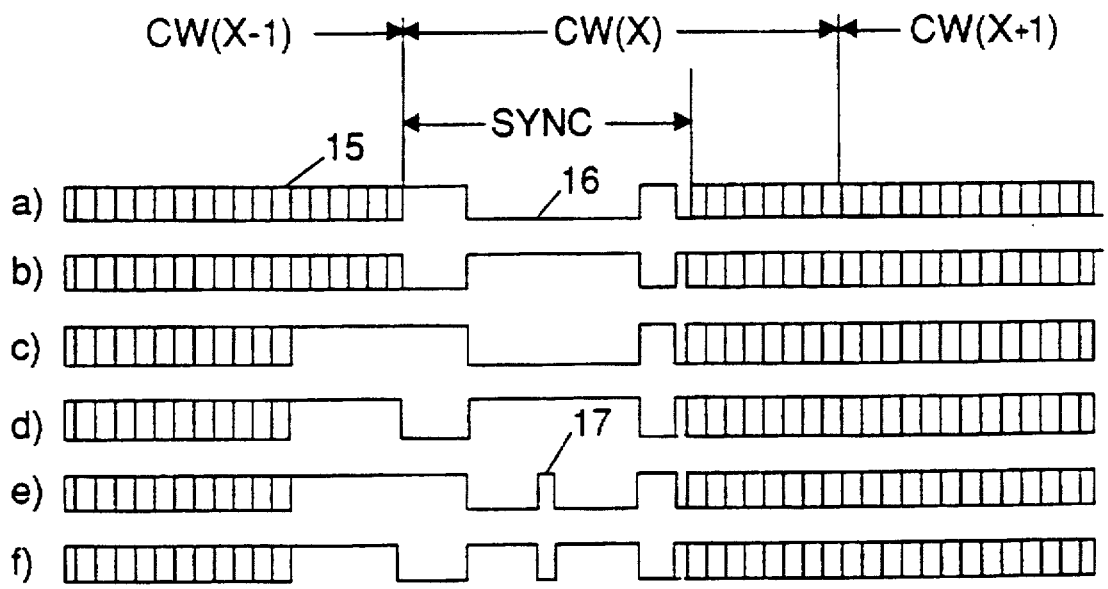
FIG. 2 shows data signals having keyed-in synchronization bit patterns (a, b, c, d) and having synchronization bit patterns (e, f) which have been modified according to the invention.

This change of the synchronization pattern is illustrated in FIG. 2. In this case, the signal can be composed, for example, of 25-bit code words, a 17-bit synchronization pattern being inserted into the code word x. Two mutually inverse bit patterns (FIGS. 2a, 2b) are preferably combined as synchronization pattern, there occurring in the synchronization pattern a comparatively large run length value which is intended as far as possible not to be reached or exceeded in the rest of the signal.

FIG. 2c shows that an incorrect decision is possible with regard to the maximum run length if, during selection of the code words containing the synchronization pattern, the maximum run length of the synchronization pattern additionally occurs at another point in a code word. This is brought about in the signal in FIG. 2c by virtue of the fact that uniting the synchronization pattern with the preceding code word produces a run length which corresponds to the maximum run length here in the synchronization pattern. The determination of the maximum run length produces, as a result of the run length in the synchronization bit pattern, the same value 10 both in the signal according to FIG. 2c and in the signal according to FIG. 2d. The fact that the maximum run length also occurs a second time in the signal according to FIG. 2c cannot be registered when using a simple selection logic arrangement. Since the spectral decision is decisive given the same maximum run length value for both code words, it may therefore happen that the signal according to FIG. 2c is selected, although in accordance with the coding prescription the signal according to FIG. 2d ought to be selected.

FIGS. 2e and 2f illustrate the signals which are fed according to the invention to the circuit unit 5 in FIG. 1 for checking the run length. In this example, the inventive change of the synchronization pattern is achieved by inverting the binary value of a bit approximately in the centre of the large run length. This measure then permits a clear decision regarding the maximum run length. Since only the signal from FIG. 2e now has the excessively large run length value upstream of the circuit unit 5, while the run length for the signal from FIG. 2f is distinctly smaller, the signal according to FIG. 2d is now correctly selected in the selection circuit 7 and switched through to the output 8.

It goes without saying that the synchronization signal can also be changed by inverting a plurality of bits, these bits not necessarily having to be the bits in the centre of the large run length of the synchronization bit pattern.

The invention can be used, for example, in devices for the digital recording of audio and/or video data on magnetic tapes, such as DVC, or optical discs, such as CD or DVD.

I claim:

1. Method for the generation of a channel-coded binary signal (15), comprising n-bit code words which are respectively assigned to m data bits, bit patterns (16) serving for synchronization being inserted into the signal, characterized in that a circuit for determining the run length is influenced by changing the bit pattern serving for synchronization or by an additional level transition identification signal, in such a way that a reduced run length value is determined in the region of the bit patterns serving for synchronization, wherein an optimum code word is selected for said signal based on the reduced run length and which includes the original bit pattern serving for synchronization.

2. Method according to claim 1, wherein the bit patterns (16) serving for synchronization have a run length which is greater than the maximum run length value which is aimed at for the rest of the signal, and the bit patterns (17) are changed upstream of the circuit unit (5) serving to determine the run length, in such a way that the maximum run length value is less than or equal to the maximum run length value which is aimed at for the rest of the signal.

3. Method according to claim 1, wherein a bit is inverted (17) approximately in the centre of the largest run of identical bits in the bit pattern serving for synchronization, for the purpose of changing the bit pattern.

4. Circuit arrangement for the generation of a channel-coded binary signal comprising n-bit code words respectively assigned to m data bits, each said code word including a bit pattern (16) serving for synchronization inserted into said code word, said circuit arrangement having a circuit unit for determining the run length (5), wherein a circuit (9) generates pulses which, with the aid of an EXOR gate (10) arranged upstream of the circuit unit (5) serving to check the run length, effect a binary value inversion (17) of one or more bits of the bit pattern serving for synchronization.

5. Circuit arrangement according to claim 4, wherein the pulses are generated at the sync block frequency fs and are situated in the region of the largest run of identical bits within the bit pattern (16) serving for synchronization.

6. Circuit arrangement according to claim 4, further including a precoding circuit (1), a block (2) for generating bit patterns serving for synchronization, a changeover switch (3) for inserting bit patterns, serving for synchronization, into the data stream, a circuit for spectrum comparison (4) and circuits for the determination (6) and selection (7) of the optimum code word.

* * * * *